US008086557B2

(12) United States Patent
Ait-Mokhtar et al.

(10) Patent No.: US 8,086,557 B2
(45) Date of Patent: Dec. 27, 2011

(54) METHOD AND SYSTEM FOR RETRIEVING STATEMENTS OF INFORMATION SOURCES AND ASSOCIATING A FACTUALITY ASSESSMENT TO THE STATEMENTS

(75) Inventors: Salah Ait-Mokhtar, Grenoble (FR); Aude Rebotier, Biviers (FR); Agnes Sandor, Meylan (FR)

(73) Assignee: Xerox Corporation, Norwalk, CT (US)

( * ) Notice: Subject to any disclaimer, the term of this patent is extended or adjusted under 35 U.S.C. 154(b) by 918 days.

(21) Appl. No.: 12/107,209

(22) Filed: Apr. 22, 2008

(65) Prior Publication Data
US 2009/0265304 A1 Oct. 22, 2009

(51) Int. Cl.
G06F 15/00 (2006.01)
G06F 15/18 (2006.01)
(52) U.S. Cl. ........ 706/62; 706/45; 706/52; 706/55; 707/705; 707/708; 707/728; 707/999.003
(58) Field of Classification Search .............. None
See application file for complete search history.

(56) References Cited

U.S. PATENT DOCUMENTS

| | | | |
|---|---|---|---|
| 6,584,470 B2 * | 6/2003 | Veale | 1/1 |
| 6,732,090 B2 | 5/2004 | Shanahan et al. | |
| 6,778,979 B2 | 8/2004 | Grefenstette et al. | |
| 6,820,075 B2 | 11/2004 | Shanahan et al. | |
| 6,868,411 B2 | 3/2005 | Shanahan | |
| 6,928,425 B2 | 8/2005 | Grefenstette et al. | |
| 7,058,567 B2 | 6/2006 | Aït-Mokhtar et al. | |
| 7,133,862 B2 | 11/2006 | Hubert et al. | |
| 2002/0198866 A1 * | 12/2002 | Kraft et al. | 707/3 |
| 2004/0158454 A1 | 8/2004 | Polanyi et al. | |
| 2005/0022114 A1 | 1/2005 | Shanahan et al. | |
| 2005/0071311 A1 | 3/2005 | Agrawal et al. | |
| 2006/0080314 A1 | 4/2006 | Hubert et al. | |
| 2007/0203869 A1 * | 8/2007 | Ramsey et al. | 706/52 |
| 2008/0005651 A1 | 1/2008 | Grefenstette et al. | |
| 2008/0228720 A1 * | 9/2008 | Mukherjee et al. | 707/3 |
| 2009/0157490 A1 * | 6/2009 | Lawyer | 705/11 |
| 2009/0157667 A1 * | 6/2009 | Brougher et al. | 707/5 |
| 2009/0158405 A1 * | 6/2009 | Malkin | 726/5 |
| 2009/0319342 A1 * | 12/2009 | Shilman et al. | 705/10 |

OTHER PUBLICATIONS

Lee et al., "Author-Oriented Model for Information Retrieval", [online]. 2004, pp. 1-10 [retrieved Jun. 13, 2011]. Retrieved from the Internet: <URL: http://wlee.net/papers/cees.pdf>.*
Soo-Min Kim et al., "Identifying Opinion Holders for Question Answering in Opinion Texts", American Association for Artificial Intelligence, 2005,7 pages.*
Soo-Min Kim et al., "Extracting Opinions, Opinion Holders, and Topics Expressed in Online News Media Text", Proceedings of the Workshop on Sentiment and Subjectivity, 2006, pp. 1-8.*

(Continued)

*Primary Examiner* — Omar Fernandez Rivas
(74) *Attorney, Agent, or Firm* — Fay Sharpe LLP (57) ABSTRACT

A system and method for providing a factuality assessment of a retrieved information source's statement are disclosed. The method includes receiving a user's query which identifies an information source whose statements are to be retrieved, retrieving documents which refer to the information source, mapping statements in the retrieved documents to their authors, identifying as information source statements, the mapped statements that are mapped to an author which is compatible with the information source, and for at least one of the information source's statements, assessing a factuality of the information source's statement according to the information source.

22 Claims, 3 Drawing Sheets

OTHER PUBLICATIONS

F.Patman, et al., *Names: A New Frontier in Text Mining. In Intelligence and Security Informatics,* H. Chen, R.Miranda, D.D.Zeng, C.Demchak, J.Schroeder and T.Madhusudan (Eds.), Springer-Verlag, pp. 27-38, 2003.

R.Sauri, et al., Annotating and Recognizing Event Modality in Text, *FLAIRS Conference,* pp. 333-339, 2006.

P.Capet, et al., Intelligent Awareness: Event Extraction, Information Evaluation & Risk Assesment, *L&TC, 3rd Language & Technology Conference,* Poznan, Poland, Oct. 5-7, 2007.

U.S. Appl. No. 11/846,740, filed Aug. 29, 2007, Brun, et al.

U.S. Appl. No. 12/028,126, filed Feb. 8, 2008, Brun, et al.

D. Kushal, et al., Mining the Peanut Gallery: Opinion Extraction and Semantic Classification of Product Reviews, *In Proceedings of the 12th International World Wide Web Conference (WWW2003),* Budapest, Hungary, pp. 519-528, 2003.

Ait-Mokhtar, et al., Robustness Beyond Shallowness: Incremental Dependency Parsing, *NLE Journal,* 2002, pp. 121-144.

Ait-Mokhtar, et al., Subject and Object Dependency Extraction Using Finite-State Transducers, *Proceedings ACL'97 Workshop on Information Extraction and the Building of Lexical Semantic Resources for NLP Applications,* Madrid, Jul. 1997, pp. 71-77.

Ait-Mokhtar, et al., Incremental Finite-State Parsing, *Proceedings of Applied Natural Language Processing,* Washington, Apr. 1997, 72-79.

S.Bethard, et al., Automatic Extraction of Opinion Propositions and Their Holders, *In Proceedings of AAAI Spring Symposium on Exploring Attitude and Affect in Text,* 2004, pp. 2224-2232 available at http://www.stanford.edu/~jurafsky/SS404BethardS.pdf.

Y.Choi, et al., Identifying Sources of Opinions with Conditional Ransom Fields and Extraction Patterns, *In Proceedings of HLT/EMNLP,* 2005, pp. 355-362.

G.Grefenstette, et al., Coupling Niche Browsers and Affect Analysis for an Opinion Mining Application, *In Proceedings of RIAO-04,* 2004, pp. 186-194.

P.Capet, et al., Intelligent Awareness: Event Extraction, Information Evaluation & Risk Assessment, *L&TC, 3rd Language & Technology Conf.* Poznan, Poland, Oct. 5-7, 2007, pp. 539-543.

G. Mishne, Web Information Access in the Blog Age: Opinions Matter, *In: The 28th Annual Int'l ACM SIGIR Conf. on Research and Dev't in Information Retrieval (SIGIR 2005)* (Abstract).

* cited by examiner

METHOD AND SYSTEM FOR RETRIEVING STATEMENTS OF INFORMATION SOURCES AND ASSOCIATING A FACTUALITY ASSESSMENT TO THE STATEMENTS

CROSS REFERENCE TO RELATED PATENTS AND APPLICATIONS

The following copending applications, the disclosures of which are incorporated herein in their entireties by reference, are mentioned:

U.S. application Ser. No. 12/028,126, filed Feb. 8, 2008, entitled SEMANTIC COMPATIBILITY CHECKING FOR AUTOMATIC CORRECTION AND DISCOVERY OF NAMED ENTITIES, by Caroline Brun, et al.

U.S. application Ser. No. 11/846,740, filed Aug. 29, 2007, entitled A HYBRID SYSTEM FOR NAMED ENTITY RESOLUTION, by Caroline Brun, et al.

BACKGROUND

The exemplary embodiment relates to the field of information retrieval. It finds particular application in connection with an automated system and method for assessing the factuality of retrieved information.

Search engines are widely used to mine information from websites, databases, and the like. Such systems are able to identify named entities (NEs) in text, such as the names of people or organizations. They can provide the user with a list of documents or document excerpts that contain occurrences of the queried Named Entity. However, if the user is interested in reading statements by an individual or statements on some topic, the user may have to read each of the retrieved documents in order to find out whether the documents contain any of the desired statements.

Systems have also been developed for what is known as opinion mining, using affect analysis. These systems aim at classifying texts according to opinions or feelings expressed in the texts about some entity or concept. However, they do not associate statements or quotations with their authors.

INCORPORATION BY REFERENCE

The following references, the disclosures of which are incorporated herein in their entireties, by reference, are mentioned:

U.S. Pub. No. 2004/0158454, entitled SYSTEM AND METHOD FOR DYNAMICALLY DETERMINING THE ATTITUDE OF AN AUTHOR OF A NATURAL LANGUAGE DOCUMENT, by Livia Polanyi, et al., discloses a method for adaptively analyzing a natural language document containing a lexical item to determine an attitude of an author towards an entity.

U.S. Pub. No. 2005/0071311, entitled METHOD AND SYSTEM OF PARTITIONING AUTHORS ON A GIVEN TOPIC IN A NEWSGROUP INTO TWO OPPOSITE CLASSES OF THE AUTHORS, by Rakesh Agrawal, et al., discloses a method which includes identifying links among authors, wherein each link represents a response from one of the authors to another of the authors, and analyzing the identified links. The identified links are assumed to be more likely to be antagonistic links rather than non-antagonistic links.

U.S. Pub. No. 2008/0005651, entitled SYSTEM FOR AUTOMATICALLY GENERATING QUERIES, by Gregory T. Grefenstette, et al., discloses a method for automatically generating a query from selected document content. A set of entities in the selected document content is identified for searching additional information related thereto using an information retrieval system. The content is analyzed to extract facets and an aspect vector produced with one or more of the extracted facets that surround the set of entities in the selected document content. A query is formulated by augmenting the set of entities with facets in the aspect vector to contextualize a search for information concerning the set of entities.

U.S. Pat. No. 7,058,567, entitled NATURAL LANGUAGE PARSER, by Salah Aït-Mokhtar, et al., discloses a finite state parser which may be utilized in natural language processing.

Mishne analyses Internet blog contents to determine their authors' psychological mood. See Mishne, G., Web Information Access in the Blog Age: Opinions Matter. In: The 28th Annual International ACM SIGIR Conference on Research and Development in Information Retrieval (SIGIR 2005).

Sauri discloses recognizing an event modality based on grammatical modality markers. See Sauri, R., Verhagen, M. and Pustejovsky, J.: Annotating and Recognizing Event Modality in Text. FLAIRS Conference 2006, pp. 333-339 (2006).

BRIEF DESCRIPTION

In accordance with one aspect of the exemplary embodiment, a computer implemented method for providing a factuality assessment of a retrieved information source's statement includes receiving a user's query which identifies an information source whose statements are to be retrieved, retrieving documents which refer to the information source, mapping statements in the retrieved documents to their authors, identifying as information source statements, the mapped statements that are mapped to an author which is compatible with the information source, for at least one of the information source's statements, assessing a factuality of the information source's statement according to the information source.

In accordance with another aspect of the exemplary embodiment, a system for providing a factuality assessment of a retrieved information source's statement is provided. The system includes a query formulator for receiving a user's query which identifies an information source whose statements are to be retrieved and generates a query for retrieving documents from an associated source of documents which refer to the information source. A mapping component is provided for mapping statements in the retrieved documents to their authors and identifying as an information source's statement, a statement that is mapped to an author which is compatible with the information source. A factuality determiner determines a factuality of the information source's statements, based on the content of the statement.

In accordance with another aspect of the exemplary embodiment, a graphical user interface which receives a user's query that identifies an information source whose statements are to be retrieved and displays retrieved statements which have been attributed to the information source together with an indicator of their factuality.

DETAILED DESCRIPTION

Aspects of the exemplary embodiment relate to a method and system for automatically searching for statements of an information source in local or remote documents. Retrieved statements are annotated with respect to their factuality according to the information source.

The system and method can be applied in any domain of information extraction from heterogeneous sources where the relevance of the information extracted depends on the information source, and where the texts describe both factual and not factual events. Such domains include, for example, government intelligence, such as homeland security, and business intelligence. The method can be used for tracking events. The system can also assist individual users in searching for statements of particular persons.

An information source, as used herein can be a named entity, such as a person or organization, to which a statement can be attributed. Examples include names of people, such as reporters, politicians, scientific experts, and names of corporations, news media sources, and the like. While particular reference is made to a person name as being an information source, it is to be understood that statements attributed to organizations and groups of people are also contemplated. The term "information source's statements" is used herein to refer what the information source says or is reported to have said on some topic. Such statements can be found in published/signed texts or in interviews, and they can be reported in other documents such as newspaper articles and newswires. A statement may consist of a phrase or one or more sentences.

A "document" is used herein to mean an electronic (e.g., digital) recording of information. A document generally includes text, in a natural language, such as English and may comprise an entire document or an extract thereof. The text is generally in a form which can be extracted (e.g. directly or by OCR processing) and processed using natural language processing (NLP) techniques. A document may be as short as a sentence or may be several paragraphs or pages in length, or longer.

The exemplary system and method analyze a retrieved statement and identify a factuality of the statement, according to the information source. "Factuality according to the information source" refers to whether the information source expresses the content of the retrieved statement as being factual (i.e., something is the case), counter-factual (i.e., something is not the case) or possible (i.e., all the other cases). In the exemplary embodiment, the factuality is inferred from the form of the sentence or sentences which make up the statement and does not rely on fact checking or other external verification of a statement's veracity. Rather, a linguistic analysis of the statement is used to determine the form of the predicate or predicates within the statement, and based on this determination, a factuality is assigned to the statement as a whole.

Figure 1:
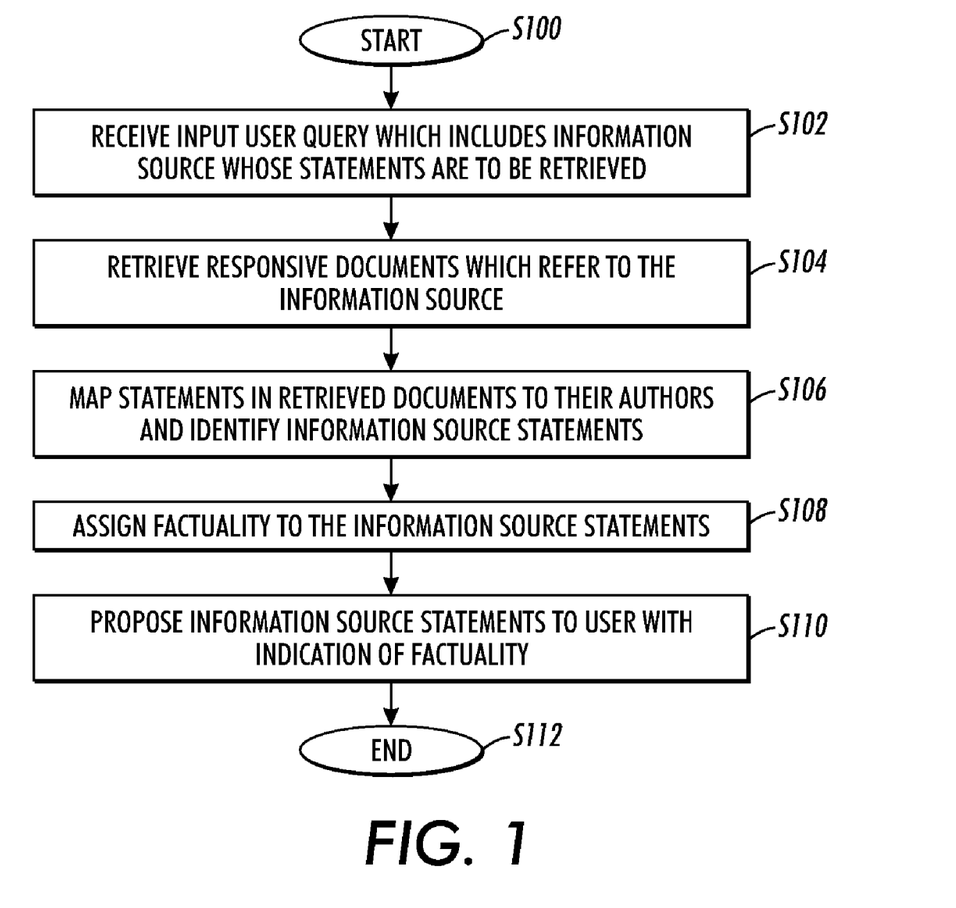
FIG. 1 is a flow diagram of a method for automatically searching for statements of an information source and for assigning a factuality to the statements in accordance with one aspect of the exemplary embodiment.

FIG. 1 illustrates an exemplary method for providing a factuality assessment of a retrieved information source's statement. The method begins at S100.

At S102, a user query is input by a user and received by the system. The query identifies an information source or sources (e.g., the name of a person or organization) whose statements are of interest to the user.

At S104, documents are searched, e.g., by a search engine, and responsive documents are retrieved. Each responsive document includes a reference to the queried information source, either within the document or associated with it. The reference may be the information source name as entered in the query or a name which is determined to be compatible with it by application of processing rules.

At S106, the structure and linguistic content of the retrieved documents are analyzed and the statements they may contain are mapped to their author names. Statements mapped to author names which are compatible with the information source of the user's query are identified as the information source's statements and retrieved.

At S108, for each information source statement, a factuality determination is made, based on one or more of the sentences of the statement. The statement is classified and annotated or otherwise marked, based on the determination.

At S110, statements that satisfy the user's query are proposed to the user. The statements are associated with an indicator of their factuality. For example, a color code indicates the factuality of the statements according to the information source. Each statement may be displayed along with its author, its date/time when available, a link to its source document, as well as a pointer to the location of the statement in the source document.

The method ends at S112.

Figure 2:
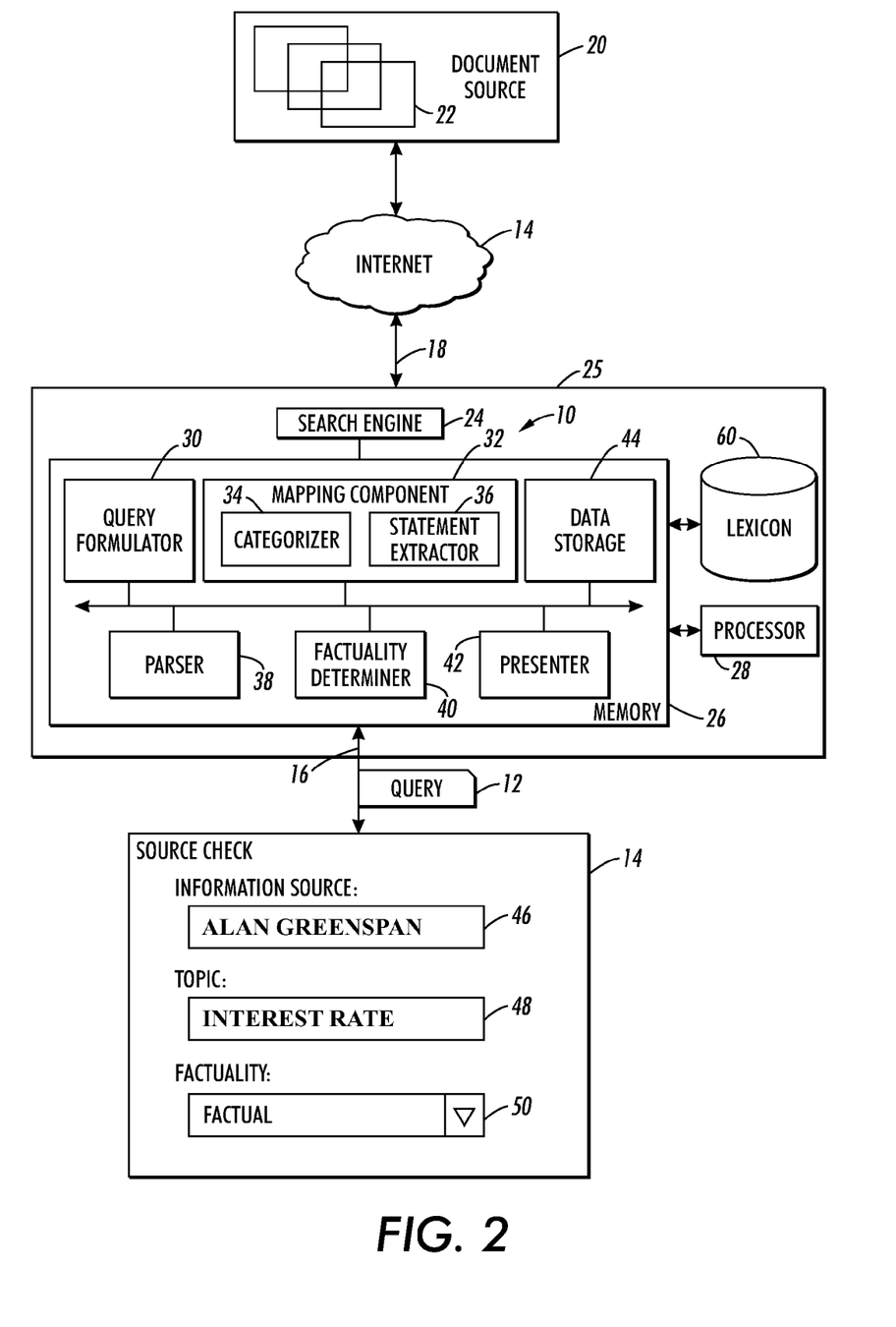
FIG. 2 is a functional block diagram of an operating environment in which a system for automatically searching for statements of an information source and for assigning a factuality to the statements operates in accordance with another aspect of the exemplary embodiment.

FIG. 2 illustrates an information retrieval system 10, which may be used for performing the exemplary method outlined above, in an operating environment. The information system 10 receives a user query 12 from a user input device 14, here illustrated as a graphical user interface, which may be displayed on a user's computer screen. Communication links 16, 18 such as an internet connection, a local area network, a corporate data network, telephone line, or other wired or wireless link, serve as connections between the user input device 14 and system 10 and between the system 10 and a document source 20, such as a database, website, or the like which stores or provides access to documents 22. A search engine 24, which may be a part of the system 10 or remote therefrom, queries the document source 20 to retrieve responsive documents 22.

The information retrieval system 10 may be hosted by a computing device 25, such as one or more general purpose computing devices or dedicated computing device(s), such as a server, desktop computer, laptop computer, personal digital assistant, cell phone, or other device with computing capability. The exemplary system 10 may be embodied in hardware, software or a combination thereof. In the exemplary embodiment, the system 10 comprises software processing instructions stored in the computing device's memory 26 and a processor 28, in communication with the memory (e.g., via a system bus), which executes the instructions. In particular, the processor executes computer program instructions stored in memory 26 for implementing the exemplary method described above with reference to FIG. 1. As will be appreciated, components of the system 10 may be located remotely of each other and communicate via suitable wired or wireless links.

FIG. 2 illustrates the information retrieval system 10 as including a plurality of software processing components and subcomponents 30, 32, 34, 36, 38, 40, 42 which for ease of illustration are shown as separate blocks. However, it is to be appreciated that these components may be combined in any arrangement or subdivided into subcomponents. In particular, the processing components include a query formulator 30, which generates a query, based on the user's input query. A mapping component 32 extracts statements and maps them to their author. The exemplary mapping component includes a categorizer 34 which categorizes the retrieved documents according to content structure and an extractor 36 which uses shallow or more robust parsing, depending on the assigned category of the document. A syntactic parser 38 provides robust parsing for documents containing unstructured statements. A factuality determiner 40 determines a factuality modality of the extracted statements and outputs a factuality for at least one of the information source's statements. A presenter 42 selects responsive statements and presents them to the user, e.g., via the interface, along with an indication of their factuality.

The processor 28 may comprise one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 1, can be used as the processor.

The memory or memories 26 may represent any type of computer readable medium such as random access memory (RAM), read only memory (ROM), magnetic disk or tape, optical disk, flash memory, or holographic memory. In one embodiment, the memory 26 comprises a combination of random access memory and read only memory. Memory 26 stores instructions for performing the exemplary method and may include data storage 44 for storing the retrieved documents and information extracted therefrom.

Further details of the exemplary system and method now follow.

Query Input (S102)

In the exemplary embodiment, a user enters a query via an interface 14, as shown in FIG. 2. The interface is displayed, e.g., in a web browser on a screen of the user's computing device, when the user indicates that an information source statement factuality search is desired. The interface 14 allows a user to select an information source, for example by typing or otherwise entering a person or organization name in an information source field 46. The user may be permitted to narrow the search to a topic by entering keywords in a topic field 48. Further, the user may be permitted to specify a factuality according to its modality (factual, counter-factual, or possible) in a factuality field 50. Thus, for example, if a user wishes to retrieve only counter-factual statements by the named person, the user may click on "counter-factual" on a drop-down menu.

Document Retrieval (S104)

The system 10 receives the user's query as input, i.e., the name(s) of the author(s) of the desired statements and any specified factuality of the statements and any limitations as to topic. The system reads the user query and formulates a search which is input to the search engine 24 for retrieving responsive documents 22 from the document source 20.

The search is formulated to retrieve documents which refer to the information source and which may contain statements which are subsequently attributed to the information source. Searching may be performed locally (e.g., of a locally stored database via an intranet) and/or remotely (e.g., via the Internet). The documents 22 may be retrieved using any suitable Information Retrieval (IR) and Named Entity (NE) recognition technologies. At this stage, the responsive documents may include documents that are attributed, directly or indirectly, to the information source (e.g., person or organization name(s)) of the query, but may also include documents which do not contain any statements attributable to the information source.

Using existing Information Retrieval (IR) and Named Entity (NE) recognition technologies, the system searches for all the relevant documents where the queried person names or keywords occur, and retrieves them. Depending on user options, the documents are searched locally and/or remotely (local storage, Intranet and/or Internet files). For each retrieved document, the system keeps track of its source location for further usage. Techniques for named entity recognition in documents which can be used for retrieving documents responsive to the queried information source are available. In general, the search engine looks for documents which contain the named entity as entered in the query, or an expression which is considered equivalent thereto, for example, in the format Last Name, First Name. Middle initials/middle names may be ignored, if the query does not specify one.

Mapping Statements to their Authors (S106)

Figure 3:
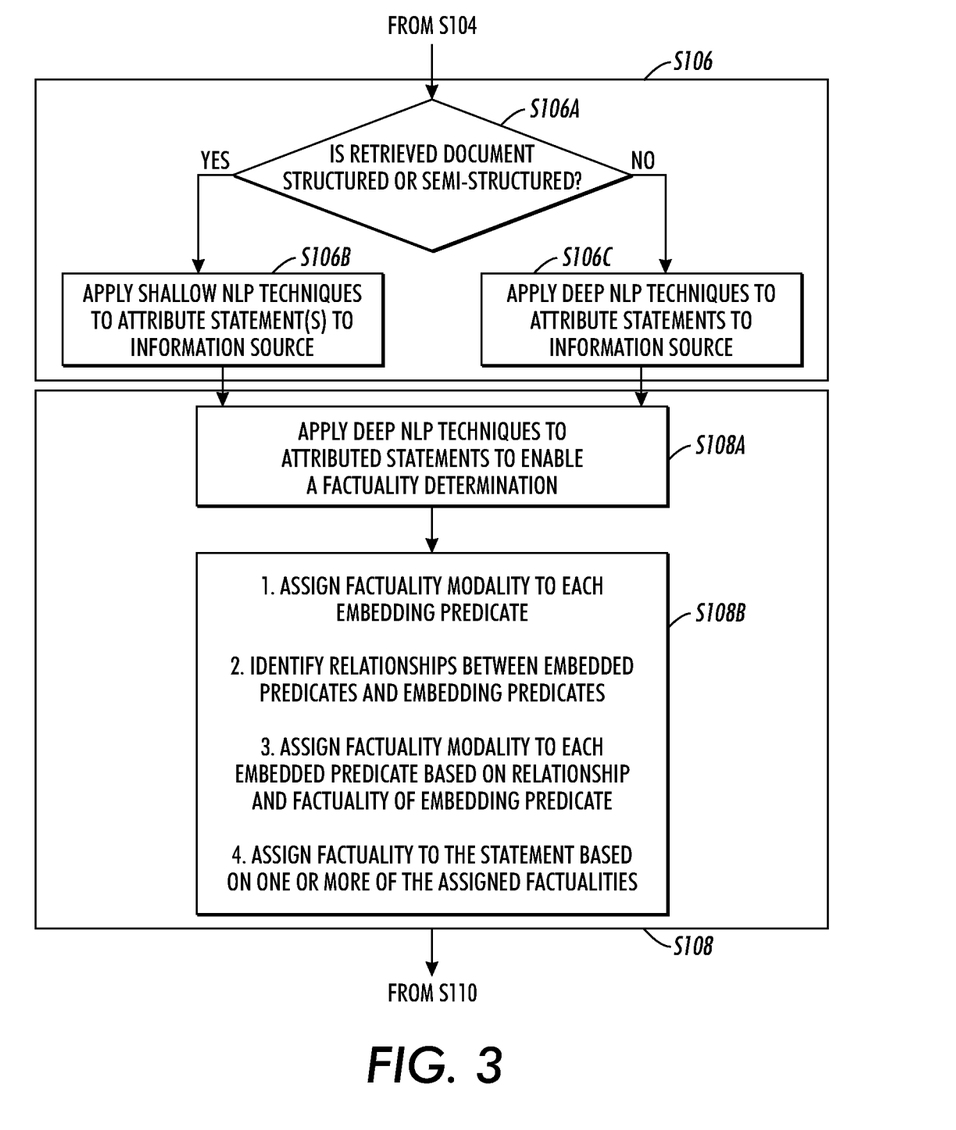
FIG. 3 illustrates a method for attribution of statements to their authors and assigning a factuality thereto in accordance with one aspect of the exemplary method of FIG. 1.

In the mapping, a statement can be attributed to an author that can be external to the document text, such as a listing of the information source as the author of the document, or in the form of a by-line in the case of newspaper articles. Or, the attribution may appear within the text of the document. To deal with the different levels of processing required for identifying each of these types of attribution and providing a mapping, step S106 may proceed as shown in FIG. 3. At S106A, to each retrieved document, a category is assigned from a set of categories. In particular, the categorizer 34 of the system 10 classifies the retrieved documents into statement-based categories based on their content structure. This classification is performed mainly by analyzing the document structure and using very shallow Natural Language Processing (NLP) techniques. These may be performed by the parser 38, or by using a separately stored, limited set of processing rules.

In the exemplary embodiment, three categories are used: Interview, Signed text, and General. The Interview and Signed text categories are specific to documents where statements are structured or semi-structured. The General category is used for documents that may contain unstructured and explicitly or implicitly reported statements, such as newspaper articles or newswires. For example, an Interview document contains an introduction and an alternating sequence of sections of statements by the interviewer and statements by the interviewee. A Signed text is a text signed by one or more authors, expressing the author's analysis or opinion on some topic, and published in a newspaper, a journal, the proceedings of a conference or on a webpage, or the like. The author name(s) may occur at the beginning of the document (usually after the title), and may be identified by introductory keywords, such as "By:," or by their location, e.g., at the end of the text.

The list of specific statement-based categories can be extended to handle new semi-structured document types if appropriate, with the system classifying procedure being modified to recognize and correctly handle the new categories.

As used herein, "structured statements" are statements in a database which are unambiguously linked to the author, e.g., with hypertext links, tags, or where they are assigned to fields of their authors. These are generally of the signed text class, where the signature corresponds to the name of the queried information source. "Semi-structured statements" are collections of interviews and signed texts in a unified format where the statement can be linked to the author through minimal processing of the text. For example, an interview may be in the form of alternating paragraphs corresponding to a reporter's questions and interviewee's (information source) answers. "Unstructured statements" are reported statements in running text, such as a sentence, often enclosed by quotation marks, but not necessarily so, preceded or followed by an expression indicating that this is what the information source said. These are classed in the General category. These statements require more processing to link them to an information source since the type of expressions used is quite varied.

At S106B, for each retrieved document belonging to the Signed text or Interview category, the structured and semi-structured statements they contain are extracted, along with the names of their authors and the statement date/time when available, using predefined information provided by the document structure and very shallow natural language processing (NLP) analysis. Depending on the structural and layout properties of a document, and using shallow NLP analysis to recognize structural keywords and person names, the system recognizes the statements contained in the document, and maps them with their AUTHOR name (which may or may not be the information source).

In the case of an Interview, all the statements of the interviewee are extracted. Their author name is extracted by analyzing the interview introduction with NE recognition and NLP techniques and/or checking the head name preceding each of the interviewee answers, when available.

In the case of a Signed text, the whole text is retrieved as a statement made by the author, whose name is extracted either in the header of the document or at the end of the document. The date/time is also extracted when available in the header/end of the document.

As will be appreciated, if an identified author of a statement which is structured or semi-structured is not the information source but the information source appears somewhere in the document, the document may be processed to identify any unstructured statements, according to the methods below.

At S106C, for each retrieved document of the General category, robust NLP analysis is used to search and retrieve potential unstructured statements along with the name of their authors and the statement dates and time, where this information is available.

Examples of (reported) unstructured statements are shown in bold in the sentences below:
(1) Greenspan said it appears the country has promised more than it can afford to deliver in Social Security.
(2) Mr. Brown said: "All my spending plans are affordable. We meet all our fiscal rules."
(3) "The job market has clearly recovered from the setbacks and dislocations caused by the series of hurricanes," said Stuart Hoffman.
(4) The package struck a balance between "tax cuts that are affordable, investments that are essential and stability that is paramount," the Chancellor said.
(5) "There is no such thing as the United Nations," he stated in 1994.
(6) "It is no way that we will give up rebate without a fundamental agricultural reform," he said.
(7) "We needed this conversation—it was very tough but very important," Polish Prime Minister Kazimierz Marcinkiewicz told reporters. "Mr. Blair did not present concrete figures but I can say Poland will not agree to a bad budget."

In the example sentences above, the statements are reported either implicitly (example (1)) or explicitly (between quotation marks, examples (2) and (3)). There are also mixed (implicit/explicit) statements (example (4)). Explicitly reported statements are inferred to be identical to the original statements, while implicitly reported ones can be considered "paraphrases" of the original statements. All of these types of statement can be extracted by the exemplary embodiment, although it is also contemplated that the method may be limited to explicit statements.

In order to recognize and extract unstructured statements in a document, the whole text document is first analyzed with a robust natural language parser 38, such as the Xerox Incremental Parser (XIP). For details of such a parser, see, for example, U.S. Pat. No. 7,058,567 to Aït-Mokhtar, et al.; Aït-Mokhtar, S., Chanod, J.-P. and Roux, C. "Robustness beyond shallowness: incremental deep parsing," in Natural Language Engineering, 8(3), Cambridge University Press, pp. 121-144 (2002); Aït-Mokhtar, et al., "Incremental Finite-State Parsing," Proceedings of Applied Natural Language Processing, Washington, April 1997; and Aït-Mokhtar, et al., "Subject and Object Dependency Extraction Using Finite-State Transducers," Proceedings ACL'97 Workshop on Information Extraction and the Building of Lexical Semantic Resources for NLP Applications, Madrid, July 1997.

Briefly, the parser 38 processes the input text of a retrieved document to identify its base constituent parts, typically including words and punctuation. Each word, punctuation mark, or text element is referred to as a token. An attempt is then made to associate each text element token with lexical information contained in a lexicon 60. The words in the lexicon are indexed according to their part of speech and other morpho-syntactic information. For example, nouns, verbs, adverbs, etc. are first extracted and groups of linked words, such as noun phrases, verb phrases are identified. Syntactic analysis then identifies relationships (dependencies) between text elements (words or groups of words). In the present system, the text analysis provides the following information for each sentence:

Expressions for information transfer are marked. These are verbs, nouns multi-word expressions, or other expressions that often introduce unstructured statements in texts, e.g., "say," "tell," "declare," "warn," "announce," "add," "respond," "declaration," "according to" etc. The list of such expressions is finite; therefore they are indexed in the lexicon 60 with a specific feature. Text elements, such as words or phrases within the document corresponding to the indexed expressions are marked when they are found. As used herein, marking refers to any type of annotation of the document, such as adding XML tags, or providing a separate file in which the marked terms are identified, or the like. Exemplary information transfer expressions are underlined where they appear in the sentences above for illustration purposes only.

The main grammatical functions (between words and/or groups of words) are recognized, e.g., subject, complement, modifier. The subject can be a noun, noun phrase, or pronoun, and in languages such as English, agrees with the verb, i.e., in person and number. The subject is generally the author of the statement. However, authors can also be nominal complements. The complement is generally the object of the verb, and is therefore a candidate statement. Where the author is the information source, the statement is mapped to the information source. Modifiers include temporal expressions which modify the complement, such as "yesterday." These are used to find temporal information for a statement.

Since the expressions for information transfer constitute a finite list, the syntactic functions can be mapped into semantic roles. This includes determining the textual element that is expressed as the author. Therefore, in the statement example (1) above, "Greenspan" is recognized as the subject of the information transfer verb "said," and mapped into the semantic role of author, and the whole expression in bold is extracted as the complement of "said". In example (2), the parser recognizes that the group of two sentences in bold is the complement of "said". A statement that occurs alone in a sentence (e.g., the second sentence of example (7)) is concatenated to the complement of the nearest preceding information transfer expression.

Co-reference relations involving named entities of the type person are recognized. Specifically, anaphors/cataphors, such as pronouns and abbreviated names are linked to the person name expression that refers to the same person in the same document, and that contains more information on the referred person (last name, first name, professional title, etc.). For example, in example (1), "Greenspan" is linked to the more informative occurrence "Alan Greenspan" elsewhere in the document. In example (4), "the Chancellor" is also linked to its antecedent, e.g. "Chancellor Gordon Brown". The same applies for pronouns like "he" in (5) and (6).

Once the document has been parsed and the basic linguistic information is extracted, statements can be extracted with the following algorithm:

For each information transfer expression in the document:
1. Extract its sentential complement as a statement
2. Extract its subject or nominal complement.
3. Map its subject or nominal complement as being the author of the statement. If the subject or nominal complement has a co-reference link to an (antecedent) person name expression, then consider the antecedent expression as the author of the statement.
4. If the information transfer expression has a temporal modifier (date or time), then extract it as a date-time attribute of the statement (e.g., "in 1994" in example (5) above).

In this way, each statement is mapped to its author and, where the author is the queried information source, is marked as being a statement of the information source. As will be appreciated, a complement is an argument of a predicate, i.e., a constituent that is necessary in order that the predicate can be considered as structurally complete. If the complement is the equivalent of a sentence, the complement is a sentential complement. If it is a noun, it is a nominal complement. For example, given the following text:

Mr. Brown said: "All my spending plans are affordable. We meet all our fiscal rules."

The word 'said' is identified in the text as an expression of information transfer Mr. Brown is identified as the subject of "said" and mapped to the author. The sentential complement 'All my spending plans are affordable' is extracted as a statement of Mr. Brown. "We meet all our fiscal rules." is concatenated to the adjacent sentential complement, and thus is also extracted as a statement of Mr. Brown.

Assigning Factuality to the Extracted Statements (S108)

At S108A, all statements that are identified in S106B as being structured/semi-structured statements of the information source and for each retrieved document where potential unstructured statements are attributed to the information source, along with the name of their authors and the statement dates and time when available, a robust NLP analysis is performed to identify references to events, and specific dependencies between elements of the statements (some of which may have already performed at S106C) which allow a factuality determination to be made.

At S108B, a factuality is assigned to the statements by applying a set of factuality rules. This determination is based on the sentences of the statement. The statement is classified and annotated, based on the determination. The sentences in the statements may be tagged according to three categories of factuality (factual, counter-factual, possible).

In particular, for each statement identified in S106B or S106C, each predicate (which includes either a verb or a noun which refers to an event, such as "meeting," "war," etc.) of what has been extracted as a statement is assigned a factuality modality. The predicate may thus be characterized as factual, counter-factual or possible (neither factual nor counter-factual) as expressed by the information source. In general, the tense of the verb is used in determining whether it is factual. Finite verbs, for example are factual (unless modified with a modifier which expresses negation, and non-finite verbs are not factual. Events which are identified as being in the past are generally factual, while those to occur in the future are generally not classed as factual. Embedded predicates are those which depend on another predicate, and in this case, the factuality depends on the embedding verb. The factuality may be computed by taking into account some or all of the following factors with respect to each predicate:

1. Its morphological properties: whether it is a noun (with or without a definite article), a finite verb, an infinitive, and so forth.

2. Its syntactic status: whether it is the main verb of the sentence or it is embedded in another predicate (it is in a subordinate clause, or in a noun phrase that is a modifier);

3. If it is a verb embedded in another predicate, the kind of subordination (finite clause, non-finite clause . . . );

4. If it is a noun embedded in another predicate, its syntactical function (subject, object, adverbial phrase . . . );

5. Its modifiers: the availability of negation and of modal elements (modal auxiliaries, modal adverbs, modal and temporal adjectives);

6. If it is embedded in another predicate, the lexical properties and the factuality of the later.

Two example rules are as follows:
1. If (MAIN(#1 [conj:~]) & CORE-VERB[main](#1))
then FACTUAL(#1).

This rule implies that if a finite verb (MAIN) is part of a statement (CORE-VERB), then it is assigned the factuality: factual.

2. If (CORE-DRIVE(#1,#3) & CORE-VERB(#3))
then POSSIBLE(#3)

This rule implies that if a verb (#3) is embedded into another verb (the second argument of the CORE-DRIVE dependency), and it is a predicate (CORE-VERB), then it is assigned the factuality: possible.

For each sentence, the following method is used:
a. Assign a factuality to those predicates that are not embedded in another predicate.
b. Characterize the relationships between each of the embedded predicates and the predicate in which it is embedded (embedding predicate).
c. Assign a factuality to the embedded predicates by combining the results of steps a) and b), i.e., an embedded predicate is assigned a factuality based on the factuality of the embedding predicate and on the relationship between the embedding and embedded predicates.
d. Assign factuality to statement based on one or more of the assigned factualities.

The relationships identified in step b) can be characterized according to the way the factuality of the embedding predicate affects the factuality of the embedded predicate. These relationships are either lexical properties of the embedding predicates or properties of the embedding relationship. A set of predefined relationships can be used, for characterizing the relationship as follows:

A. Possible: the embedded predicate has the factuality possible; it has the same information source as the embedding predicate. This relationship is a lexical property of most verbs and is valid for the items that they subcategorize for. As an example, consider the sentence: "They agreed to go." The verbal complement of "agree" is always possible. Thus, in this sentence, "to go" is classed as possible.

B. Factual: the embedded predicate is always factual; it has the same information source as the embedding predicate. This relationship is a lexical property of some verbs and is valid for the items that they subcategorize for. E.g.,: "They ended the war." The direct object of "end" is always factual, since "end" presupposes the existence of the direct object.

C. Facttrans: the embedded predicate has the same factuality and the same information source as the embedding predicate. This relationship is specific of syntactic dependencies. E.g. the subjects of verbs: "The negotiations will begin next week." The subject has the same factuality as the verb. Here, the verb "will begin" is classed as possible (based on the factors above), and the embedded predicate "negotiations" is therefore also classed as possible.

D. Say: if the embedding predicate is factual, then the embedded predicate is factual and its information source is the actor of the embedding predicate. If the embedding predicate is not factual, the embedded predicate is possible and it has the same information source as the embedding predicate. E.g.: "They confirmed the negotiations." Here, "confirmed" is factual, according to the factors above, so "negotiations" is also factual. For the sentence "They did not confirm the negotiations," the embedding predicate "did not confirm" is counter-factual and negotiations is considered possible.

E. Deny: if the embedding predicate is factual, then the embedded predicate is counter-factual and its information source is the actor of the embedding predicate. If the embedding predicate is not factual, the embedded predicate is possible and it has the same information source as the embedding predicate. E.g.: for "They denied the negotiations," then "negotiations" is counter factual, whereas for "They did not deny the negotiations," "negotiations" is possible.

The effects of these relationships at step c) can be represented as shown in the following table.

| Factuality of the embedding predicate | + | kind of relationship | => | Factuality of the embedded predicate |
|---|---|---|---|---|
| All | + | Possible | => | possible |
| All | + | Factual | => | Factual |
| Factual | + | Facttrans | => | Factual |
| Possible | + | Facttrans | => | possible |
| counter-factual | + | Facttrans | => | counter-factual |
| Factual | + | Say | => | Factual |
| Factual | + | Deny | => | counter-factual |
| possible/counter-factual | + | say/deny | => | possible |

The factuality of each sentence uttered by an information source can then be determined, based on the factuality of one or more of the predicates in the sentence. In one embodiment, the factuality of the sentence is identified as being the factuality of the predicate that is the most syntactically embedded predicate, disregarding those embeddings that convey additional information (like relative clauses).

Presenting Statements (S110)

At S110, one or more statements are selected from the retrieved statements that satisfy the user's query. These are statements of the queried information source, optionally on a particular topic, as specified by the query (i.e., include or appear in a document which includes one or more of the topic words or words which the search engine considers to be equivalents thereof). The statements that satisfy the user's query are proposed to the user. For example, the statements or extracts thereof are displayed via the user interface 14. The author name, the date/time, a pointer to the source (downloaded) document, and a pointer to the source location of the source document may also be displayed. The statements are also associated with an indicator of their factuality. For example, a color code indicates the factuality of the statements according to the information source (as determined in step S108). Each statement may be displayed along with its author, its date/time when available, an access to its source document, as well as a pointer to the source location of the source document of the statement.

As will be appreciated, the system 10 may retrieve statements attributed to authors whose names do not exactly match those of the information source in the user's query. In one embodiment, the system selects, from among all the extracted statements, the statements whose author names are compatible with at least one of the person name(s) provided in the user's query. Each selected statement is then displayed along with its author name and date-time attribute and assigned factuality indicated by colors.

Two person name expressions A and B (where one is the query person name and the other is the retrieved person name), may be considered compatible if and only if all the following conditions are satisfied:

A and B both contain last names (family names) and the two last names are the same.

If A has a specific gender (e.g., Mr. or Mrs.), then B either does not have a determined gender, or agrees in gender with A.

If A contains a main first name, then B does not contain any first name, or B contains the same first name, or B contains an initial which is the same as the main first name A.

If A contains a name suffix (Sr. or Jr.), then B either does not contain any suffix, or contains the same suffix.

If A contains a middle initial, then B either does not contain any middle initial, or contains the same middle initial.

The exemplary method, however, is not limited to these rules and different rules may be developed. The rules may also be applied more or less restrictively depending on the number of retrieved statements. For example, when only a few statements are retrieved, fewer of the rules may be applied.

As will be appreciated, some of the resulting statements may be irrelevant or incorrect, because the extraction process includes techniques (IR, name searching, recognition of grammatical functions and co-reference links) that are not 100% accurate and because of potential ambiguity in the author identification due to homonymy. Moreover, some statements are not self-understandable and it is necessary to access their contexts to understand them. Therefore, each statement has a pointer to the document area where it has been found and a pointer to the source location of the document, so that when the user is particularly interested in some statement, he or she can check its context, and also check the source location of the source document for reliability purposes.

The method illustrated in FIGS. 1 and 3 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIGS. 1 and 3, can be used to implement the method for assigning a factuality to retrieved statements attributed to an information source.

Without intending to limit the scope of the exemplary embodiment, the follow Example illustrates how the system may operate.

EXAMPLE

Assume that a user wishes to retrieve statements made by Mr. Brown about London. He enters "Mr. Brown" in the information source field and "London" in the topic field. The system queries a database and retrieves a set of documents which include Mr. Brown as a named entity and the keyword London. In the documents retrieved, the following text is analyzed. The predicate is underlined in each case for illustration purposes.

1. Mr. Brown said, "I plan to visit London next week."

Here, the system identifies that the word "said" is an expression of information transfer and maps the statement, "I plan to visit London next week." to its author Mr. Brown. The predicate "plan to visit" is then analyzed.

plan: finite main verb→factual to visit: infinitive→possible

The statement is presented to the user as having the factuality possible.

2. "Mr. Brown and I had a useful meeting in London this week," Mr. Green announced.

Here, the system identifies that the word "announced" is an expression of information transfer and maps the statement, "Mr. Brown and I had a useful meeting in London this week," to its author, Mr. Green. Since Mr. Green is not the information source queried, the factuality is not determined and the statement is not presented to the user. (Had the search been for Mr. Green instead of Mr. Brown, the system would have identified the predicate "had" as being past tense and thus factual and assigned a tag factuality to the statement)

3. Mr. Brown said, "I do not intend to visit London next week."

Here, the system identifies that the word "said" is an expression of information transfer and maps the statement, "I do not intend to visit London next week." to its author, Mr. Brown. The predicate "do not intend to visit" is then analyzed:

do not intend: negation→counter-factual to visit: infinitive→possible

The statement is presented to the user as having the factuality counter-factual as far as the intention is concerned and possible as far as the visit is concerned.

4. Mr. Brown was in London last week. He said, "I very much enjoyed my visit."

Here, the system identifies that the word "said" is an expression of information transfer and, through coreference resolution, maps the statement, "I very much enjoyed my visit." to its author, Mr. Brown. However, since the topic "London" does not appear in the statement, the system does not return this statement or assign a factuality.

5. "I did not include London in my last European trip," Brown told reporters on Monday.

Here, the system identifies that the word "told" is an expression of information transfer and maps the statement, "I did not include London in my last European trip," to its author, Brown, and concludes this is compatible with Mr. Brown. "on Monday" is identified as a temporal expression and may be tagged as such. The predicate "did not include" is identified within the statement and analyzed:

did not include: negation→counter-factual

The statement is presented to the user as having the factuality counter-factual.

6. Mr. Brown said, "I usually stay in Mayfair when visiting London."

Here, the system identifies that the word "said" is an expression of information transfer and maps the statement, "I usually stay in Mayfair when visiting London." to its author, Mr. Brown. The predicate "visiting" is then analyzed:

visiting: non-finite verb→possible

The statement is presented to the user as having the factuality possible. Since the exemplary system does not know that Mayfair is in London, the word 'stay' may not be analyzed.

7. Mr. Brown said that he considers London to be an interesting place to visit.

The system identifies that the word "said" is an expression of information transfer and maps the embedded statement "he considers London to be an interesting place to visit" to its author, Mr. Brown. Three predicates are identified, "considers," "to be" and "to visit". The system analyzes the predicates:

considers: finite main verb→factual to be: infinitive→possible to visit: infinitive→possible

The statement is presented to the user as having the factuality factual as far as the consideration is concerned, possible as far as London's being an interesting place is concerned and possible as far as the visit is concerned.

Applications

By allowing for automatic search and retrieval of information sources' statements and the factuality to these statements, the exemplary embodiment finds use in:

1. Researching people's expressed positions and ideas;

2. Identifying the top topics on which a person makes statements and hence capturing the person's interests;

3. Examining a person's statements in order to evaluate the person's coherence and reliability, or detect incoherence;

4. Finding potential contradictions or agreements between people's statements on a given topic;

5. Extracting statements according to their factuality in order to trace facts or potential facts.

By way of example, possible applications of the system and method disclosed herein include:

a. Collecting relevant statements made by people that are involved in a litigation process.

b. Helping intelligence and security services or committed lobbies and organizations to track suspicious, subversive or illegal statements and tendencies. Examples of such statements are those calling for violent actions, or applauding terrorism, or publicly defending racist ideas, Holocaust denial, etc.

c. In the domain of homeland security, monitoring of potentially dangerous events that have taken place, due to the fact that the sources concerning the information on the events can be identified, and thus the reliability of the information can be assessed.

d. Helping financial/business analysis/watch by efficiently tracking and examining the statements and thoughts of representatives of key economical actors.

e. Helping journalists in preparing relevant questions for interviews of politicians, stars/artists, business/economical actors, etc.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer implemented method for providing a factuality assessment of a retrieved information source's statement comprising:
  with a processor:
    receiving a user's query which identifies an information source whose statements are to be retrieved;
    retrieving documents which refer to the information source;
    mapping statements in the retrieved documents to their authors;
    identifying as information source statements, the mapped statements that are mapped to an author which is compatible with the information source;
    for at least one of the information source's statements, assessing a factuality of the information source's statement according to the information source.

2. The method of claim 1, wherein the factuality assessment is based on the form of the statement.

3. The method of claim 1, further comprising:
  marking the information source's statement based on its assessed factuality.

4. The method of claim 1, wherein the factuality is selected from a plurality of factuality modalities.

5. The method of claim 3, wherein the factuality modalities comprise factual, counter-factual, and possible.

6. The method of claim 1, wherein the mapping includes determining whether a retrieved document is structured or semi-structured and, if so, applying shallow natural language processing to map a statement of the retrieved document to its author.

7. The method of claim 5, wherein when a retrieved document determined not to be structured or semi-structured, the method includes applying more robust natural language processing to map a statement of the retrieved document to its author.

8. The method of claim 1, wherein the method further includes identifying whether an expression for information transfer is present in a retrieved document and for the identified expression, processing a sentence in which the expression occurs to identify a candidate statement in the sentence.

9. The method of claim 7, comprising accessing a lexicon in which text elements which are expressions of information transfer are indexed as such for identifying whether an expression for information transfer is present in a retrieved document.

10. The method of claim 1, further comprising presenting an identified information source's statement to a user together with an indication of its factuality.

11. The method of claim 1, wherein the assessing of the factuality of the information source's statement comprises identifying a form of at least one predicate in the statement and determining the factuality of the statement based on the form of the at least one predicate.

12. The method of claim 10, wherein when the statement includes an embedded predicate, determining a type of relationship between the embedded predicate and an embedding predicate which embeds it and assigning a factuality to the embedded predicate based on an assigned factuality of the embedding predicate and the type of relationship.

13. The method of claim 11, wherein when a sole or embedding predicate is a verb, its factuality is a function of the tense of the verb.

14. The method of claim 1, wherein the information source is a named entity selected from person names and organization names.

15. A computer program product comprising a non-transitory recording medium which encodes instructions which, when executed by a computer, perform the method of claim 1.

16. A system for providing a factuality assessment of a retrieved information source's statement comprising memory which stores instructions for performing the method of claim 1 and a processor in communication with the memory, for executing the instructions.

17. A system for providing a factuality assessment of a retrieved information source's statement comprising:
  memory which stores as software instructions:
    a query formulator for receiving a user's query which identifies an information source whose statements are to be retrieved and generates a query for retrieving documents from an associated source of documents which refer to the information source;
    a mapping component for mapping statements in the retrieved documents to their authors and identifying as an information source's statement, a statement that is mapped to an author which is compatible with the information source;
    a factuality determiner, which determines a factuality of the information source's statements, based on the content of the statement; and
  a processing component in communication with the memory, which executes the instructions.

18. The system of claim 17, wherein the factuality determiner marks the information source's statement based on its determined factuality.

19. The system of claim 17, wherein the mapping includes determining whether a retrieved document is structured or semi-structured and, if so, applying shallow natural language processing to map a statement of the retrieved document to its author.

20. The system of claim 17, further comprising a parser which performs robust natural language processing for mapping a statement of a retrieved unstructured document to its author.

21. The system of claim 17, further comprising a lexicon accessible by the mapping component, in which text elements which are expressions of information transfer are indexed as such for identifying whether an expression for information transfer is present in a retrieved document.

22. The system of claim 17, further comprising a presenter for presenting an identified information source's statement to a user together with an indication of its factuality.

* * * * *